United States Patent
Murphy

(10) Patent No.: US 9,374,291 B2
(45) Date of Patent: Jun. 21, 2016

(54) DOWNSTREAM OFDM SIGNAL EGRESS DETECTION

(71) Applicant: ComSonics, Inc., Harrisonburg, VA (US)

(72) Inventor: John J. Murphy, Crawford, VA (US)

(73) Assignee: ComSonics, Inc., Harrisonburg, VA (US)

( * ) Notice: Subject to any disclaimer, the term of this patent is extended or adjusted under 35 U.S.C. 154(b) by 0 days.

(21) Appl. No.: 14/751,700

(22) Filed: Jun. 26, 2015

(65) Prior Publication Data

US 2015/0381468 A1 Dec. 31, 2015

Related U.S. Application Data

(60) Provisional application No. 62/018,075, filed on Jun. 27, 2014.

(51) Int. Cl.

| | |
|---|---|
| *H04L 27/00* | (2006.01) |
| *H04L 27/06* | (2006.01) |
| *H04L 12/26* | (2006.01) |
| *H04L 27/26* | (2006.01) |
| *H04L 25/03* | (2006.01) |
| *H04L 25/08* | (2006.01) |

(52) U.S. Cl.
CPC .......... *H04L 43/50* (2013.01); *H04L 25/03853* (2013.01); *H04L 25/08* (2013.01); *H04L 27/2601* (2013.01)

(58) Field of Classification Search
CPC . H04L 5/0053; H04L 5/0007; H04L 27/2613; H04L 27/2607; H04L 5/0048; H04L 2027/0095; H04L 27/2636; H04L 27/265; H04L 27/2675; H04L 5/0062; H04L 27/2678; H04L 27/261; H04L 27/2647; G06F 17/142
USPC .......... 375/261, 279, 316, 329, 343; 370/210; 708/422, 426
See application file for complete search history.

(56) References Cited

U.S. PATENT DOCUMENTS

| | | | | |
|---|---|---|---|---|
| 7,664,187 | B2 * | 2/2010 | Chen | ...................... H04L 27/265 370/210 |
| 8,605,806 | B2 * | 12/2013 | Krishnan | ............ H04L 27/2605 370/203 |
| 2007/0064821 | A1 * | 3/2007 | Chen | ...................... H04L 27/265 375/260 |
| 2009/0316634 | A1 * | 12/2009 | Sahara | ................ H04L 27/2656 370/329 |

* cited by examiner

*Primary Examiner* — Tesfaldet Bocure
(74) *Attorney, Agent, or Firm* — Whitham, Curtis & Cook, P.C.

(57) ABSTRACT

A cyclic prefix which duplicates some samples of a terminal portion of a symbol in an OFDM data stream and which is invariant in pilot tones can be detected in the presence of signals having higher levels of noise and broadcast signals by autocorrelation with one of two selected "lags". Autocorrelation will be found when the lag is equal to the number of samples in the FFT used to form a symbol in the data stream. A far stronger autocorrelation is found when the lag is equal to the sum of the FFT length and the length of the cyclic prefix and applied to pilots in the data stream. Overbuilt systems can be distinguished from a system of interest by use of pilots that do not coincide in frequency with a pilot of an overbuilt system.

12 Claims, 8 Drawing Sheets

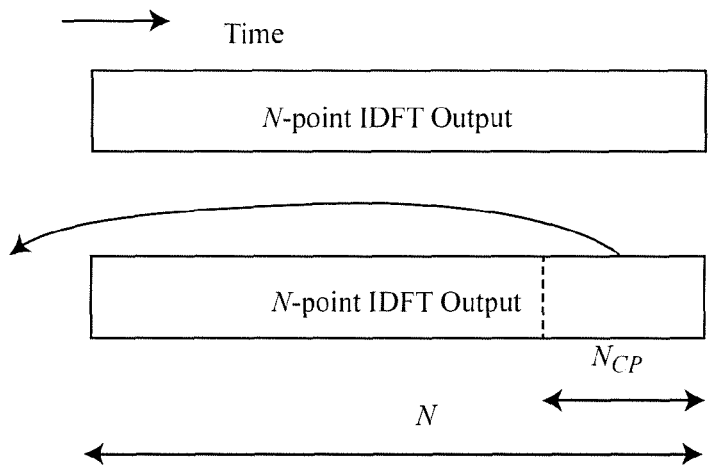
*Figure 2*
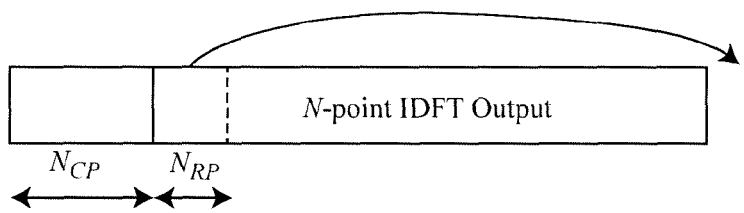
*Figure 3*
| Cyclic Prefix (μs) | Cyclic Prefix Samples ($N_{CP}$) |
|---|---|
| 0.9315 | 192 |
| 1.25 | 256 |
| 2.5 | 512 |
| 3.15 | 768 |
| 5.0 | 1024 |
| Roll-Off Period (μs) | Roll-Off Period Samples ($N_{RP}$) |
|---|---|
| 0 | 0 |
| 0.3125 | 64 |
| 0.625 | 128 |
| 0.9375 | 192 |
| 1.25 | 256 |
*Figure 4*

US 9,374,291 B2

DOWNSTREAM OFDM SIGNAL EGRESS DETECTION

CROSS-REFERENCE TO RELATED APPLICATIONS

This application claims benefit of the priority of the filing date of U.S. Provisional Patent Application Ser. No. 62/018,075, filed Jun. 27, 2014, which is hereby fully incorporated by reference herein in its entirety.

FIELD OF THE INVENTION

The present invention generally relates to detection of signal egress from broadband communications systems (BCSs) and, more particularly, egress from shielding flaws in cable communication systems of signals coded in orthogonal frequency division multiplex (OFDM) format.

BACKGROUND OF THE INVENTION

Broadband communication systems (BCSs) have proliferated in many regions of the world to distribute increasing amounts of programming for informational or entertainment purposes as well as providing networked communication between users (e.g. for telephony and video conferencing) and access to other sources of information such as the Internet. Such systems, also referred to as cable systems, use frequencies which are also used for and allocated to over-the-air broadcasting and radio communications, some of which serve emergency and safety functions. Interference is ideally prevented by confining the signals carried by BCS systems through the use of shielded cable wiring. However, as a practical matter, cable shielding flaws can occur due to damage, deterioration or poor maintenance practices and allow BCS signals to leak into the environment or allow the reciprocal effect of allowing broadcast signals and ambient noise to enter the cable.

Detection of cable shielding flaws is generally achieved through detection of the signal carried by the cable transmission system that has leaked into the environment, essentially by being broadcast from the shielding flaw. Detection of a signal that has leaked or egressed from a cable flaw may be performed in two stages: first, by a receiver in a mobile vehicle driven in the general vicinity of installed cables that associates a received signal, authenticated as originating from the BCS, with a location of the mobile vehicle using a global positioning system (GPS) receiver which thus reports a general location of a shielding flaw and, second, by a hand-held instrument that can allow repair personnel to follow increasing signal strength to the exact location of the shielding flaw so that repairs and/or maintenance can be carried out. Nevertheless, authenticating a received signal as one originating from a BCS is an inherent difficulty in locating actual cable shielding flaws since reception of a possible egress signal must necessarily be done in the presence of other radio frequency communications and noise. As the volume of information carried by a given BCS has been required to increase, coding schemes and formats have been developed to carry increasing quantities of information and, for that reason, the signal coding scheme used in BCSs has become statistically less distinguishable from noise and other radio frequency signals.

SUMMARY OF THE INVENTION

It is therefore an object of the present invention to provide a method and apparatus for detection of OFDM signals.

In order to accomplish these and other objects of the invention, a method and apparatus are provided for detecting an OFDM coded signal egressing from a shielding flaw in a cable communication system amid environmental noise, wherein the cable communication system carries data in the form of a fixed number of samples (the FFT length) comprising each symbol and each symbol further includes a cyclic prefix comprising copies of a group of samples within a symbol, comprising receiving a signal, tuning or down-converting the signal to a baseband signal, preferably a qwuadrature baseband signal, performing analog-to-digital conversion of said baseband signal to provide a digital data stream, performing autocorrelation in accordance with the symbols with a lag equal to the FFT length or a number of samples equal to a sum of the FFT length and the cyclic prefix length.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a diagram useful for understanding a cyclic prefix as provided in OFDM coding, FIG. 3 is a diagram useful for understanding windowing and rolloff period provided in OFDM, FIG. 4 is a table enumerating the permissible values for the cyclic prefix and rolloff period as specified for OFDM coding.

DETAILED DESCRIPTION OF A PREFERRED EMBODIMENT OF THE INVENTION

Figure 1A:
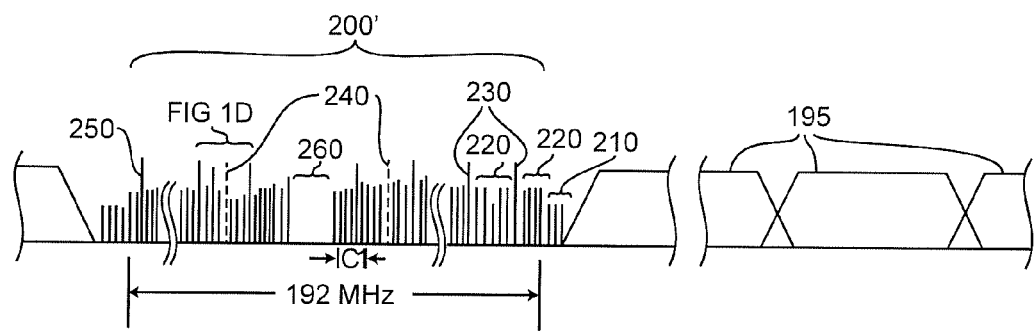
FIG. 1A is a representation of the spectrum of an OFDM format signal in a QAM format signal environment.
Figure 1B:
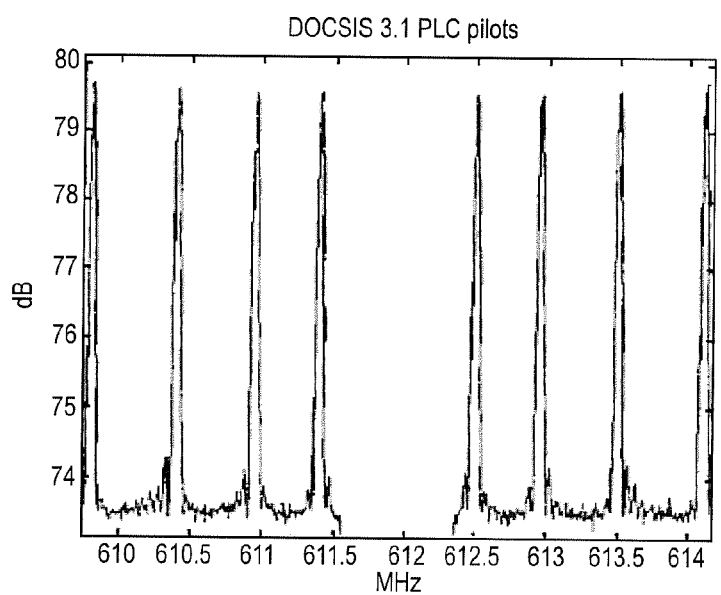
FIG. 1B is a representation of the spectrum of a portion of an OFDM block showing the required pilots near a PLC, provided in the DOCSIS 3.1 specification.

Referring now to the drawings and FIGS. 1A and 1B, in particular, there is shown representations of portions of a spectrum of signals that may be carried by a BCS. These Figures are referred to as representations since the actual spectrum would vary with data content and the number of OFDM subcarriers would be very much greater than can be illustrated in a drawn Figure such as FIG. 1A. By the same token, no portion of either FIG. 1A or 1B is admitted to be prior art in regard to the present invention but, rather, these Figures should be understood as a generalized representation of the environment of the invention and signal upon which the present invention is intended to operate.

At the present time, the need to carry ever greater amounts of information (e.g. for high definition television (HDTV), digital communications and the like) has resulted in the choice of schemes such as quadrature amplitude modulation (QAM) and orthogonal frequency division multiplexing (OFDM) to increase signals which have increased data content. QAM format signals, as specified in the Data Over Cable Service Interface Specification (DOCSIS) 3.0, can be used in any portion or the entirety of the spectral bandwidth of the BCS system. In general, for QAM signals, a plurality of QAM generators or QAM multiplexers are used, each carrying a small number of channels of information, and their outputs are combined by allocating contiguous spectral bands to each QAM multiplexer.

OFDM, specified in the recently promulgated DOCSIS 3.1 specification, is a newer and, in some aspects, open-ended format proposed for use in the telecommunications industry in which a large number of data or payload subcarriers are grouped into one or more blocks having a bandwidth (in the United States) of 192 MHZ which can be placed at any desired location in the BCS bandwidth. Each of the data subcarriers is of relatively low amplitude (to limit total signal power over the BCS system to levels comparable to earlier signal formats such as QAM) and very narrow bandwidth (e.g. 25 or 50 KHz in the United States) and spaced at frequency intervals equal to the symbol rate of 25 or 50 KHz and which are quadrature amplitude modulated in accordance with data being transmitted. A number of so-called pilot subcarriers (generally referred to simply as "pilots") of several different types are also provided which are of slightly greater amplitude. (In fact, pilots are often principally pure carrier wave tone with added digital cyclic prefixes, as will be described below, added at the symbol rate). The DOCSIS 3.1 specification also provides for so-called scattered pilots which are systematically shifted in frequency for purposes of signal monitoring (e.g. for adequate signal-to-noise ratio). The specification also requires additional fixed-frequency pilots for indicating a location of a PHY link channel (PLC). Therefore, an OFDM format signal is generally even less statistically distinguishable from random ambient noise than QAM format signals since its spectral content is essentially flat except for slightly increased amplitude of pilots. ("PHY" is not an acronym but, rather, an accepted abbreviation of the work "physical" in the context of the physical layer of the seven layer Open Systems Interconnect (OSI) model.) These requirements and recommendations of the DOCSIS 3.1 specification present several features which can be exploited individually or in various combinations to identify a received signal as a signal in OFDM format and therefore, when detected, very likely to have been propagated into the environment from a cable shielding flaw in a BCS, as disclosed in U.S. patent application Ser. No. 14/282,381, filed May 20, 2014 which corresponds to the US patent publication number 2015/0341810, assigned to the assignee of the present invention, and which is hereby incorporated by reference in its entirety.

The overall spectrum of OFDM signals in a QAM environment is illustrated in FIG. 1A. A detail of FIG. 1A is illustrated in FIG. 1B including illustration of mandatory, fixed-frequency pilots. Referring now to FIG. 1A, a 192 MHZ wide OFDM block 200' is illustrated at an arbitrary location within the BCS spectrum. The remainder of the portion of the BCS spectrum illustrated is populated with QAM bands or, simply, QAMs 195 but one or more portions of the BCS spectrum could be allocated to NTSC signals or signals of any other format. As alluded to above, more than one OFDM block 200' can be provided at arbitrary locations in the BCS spectrum. The OFDM block is then divided into subcarrier frequencies, eight of which are allocated to fixed-frequency, mandatory pilots 240 while the remainder are at least nominally allocated to data subcarriers 220 although some of those frequencies are used by other fixed-frequency pilots 230 required by the DOCSIS 3.1 specification or may be periodically occupied by scattered pilots 250 as alluded to above. Within the OFDM block is the PHY link channel (PLC) 260 which cannot be occupied by pilots and includes signals used for system monitoring and/or control or any other operational purpose in the BCS system. The frequencies of required PLC-related pilots 240 are used to indicate the location and bandwidth of the band 260 also referred to as a PHY Link Channel (PLC) which is 400 kHz wide (or 8 subcarriers at 50 kHz spacing or 16 subcarriers at 25 kHz spacing). The frequencies of the OFDM pilots and subcarriers must be closely synchronized and, for that reason, are usually generated by performing an inverse discrete Fourier transform (IDFT) on a digital representation of the spectrum to obtain a time-domain sequence of samples to be transmitted. For purposes of discussion of OFDM, a symbol may be considered as a group of related samples which is fixed in number (the size/number of samples of the IDFT, determined by the BCS operator) each covering a period of 20 or 40 microseconds (depending on the frequency spacing of the subcarriers, also determined by the BCS operator) before application of cyclic prefix as will be described below, being transmitted over a BCS.

The DOCSIS 3.1 specification also provides for some additional overhead in regard to each symbol in the data stream which can be exploited in accordance with the present invention to authenticate a received signal as an egress signal from a BCS employing OFDM. Specifically, a so-called cyclic prefix is provided to mitigate multipath and to permit the receiver to detect symbol boundaries. A so-called rolloff period may be provided to enhance the capability to suppress out-of-band artifacts in the signal.

Referring now to FIG. 2, the generation and placement of a cyclic prefix (CP) in an OFDM symbol will be explained. Each of the symbols of the downstream Orthogonal Frequency Division Multiplexing (OFDM) sub-layer of the Data Over Cable System Interface Specification (DOCSIS) version 3.1 includes a cyclic prefix (CP) for synchronization and mitigation of signal artifacts such as multipath (and micro-reflections) that may arise in the BCS infrastructure from, for example, slight impedance mismatches at different locations along a cable distribution system. This CP is added to each symbol near the end of the transmission process, after the payload portion of a symbol has been converted to a time-domain sequence of N (4096 or 8192, as selected by the cable system operator) samples by the inverse discrete Fourier transform (IDFT). The last $N_{CP}$ (as determined by the operator of the BCS) samples of each symbol are copied and inserted before the first sample of that symbol payload. This cyclic prefix provides a degree of redundancy in the transmitted signal from which correct symbol reception can be determined.

Referring now to FIG. 3, in order to optionally allow for windowing (which reduces the out-of-band spectrum occupied by the OFDM signal) defined by the DOCSIS 3.1 specification (which is published electronically under the filename CM-SP-PHYv3.1-I05-150326.pdf and has the title Data-Over-Cable Service Interface Specifications DOCSIS® 3.1 Physical Layer Specification which is hereby fully incorporated by reference), a number, $N_{RP}$, of samples may also be copied from the beginning of each symbol and appended after the last sample of that symbol. This is called the rolloff period. The cable system operator selects one of 5 specified values for $N_{CP}$ and one of 5 specified values for $N_{RP}$, as illustrated in the table of FIG. 4. It should be noted that the rolloff period is required to be smaller than the cyclic prefix (i.e. $N_{RP} < N_{CP}$), because this allows some of the cyclic prefix to be retained after windowing to aid in synchronization and mitigation of multipath. In fact, the amount by which $N_{CP}$ exceeds $N_{RP}$ determines the range of received multipath that can be mitigated based upon the maximum time differential. This is a trade-off against throughput efficiency of the data stream, which is reduced by increasing $N_{CP}$ (that increases total symbol length), which is why the cable system operator is given a range of values for these parameters. Note also that zero is a permitted option for the rolloff period. This option would make the following windowing information irrelevant but does not affect the operation of the proposed leakage detection system in accordance with the invention.

Figure 5:
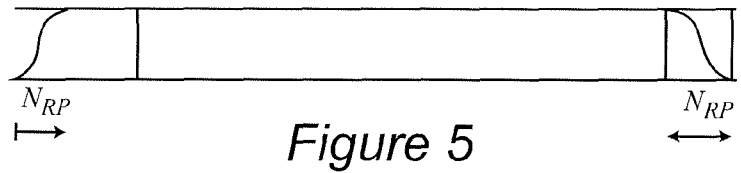
FIGS. 5 and 6 illustrate the windowing or tapering of rolloff period in a sequence of OFDM symbols.
Figure 6:
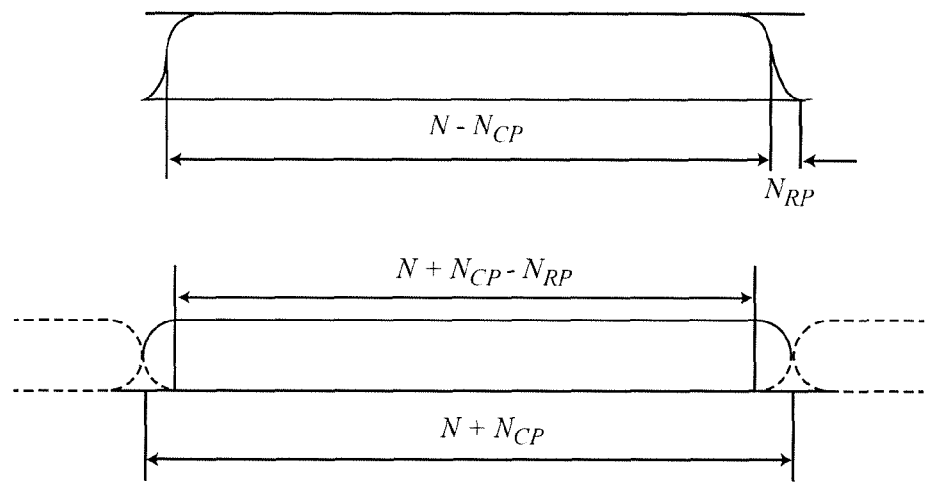

After the cyclic prefix and rolloff period are applied, the first and last $N_{RP}$ (number of rolloff period) samples of the extended/total symbol are then windowed or tapered in the time domain by a raised-cosine rolloff function, as shown in FIG. 5. When the symbol is then placed in the transmitted data stream the rolloff periods of adjacent symbols are overlapped as shown in FIG. 6. Note that the stream corresponding to a symbol then contains a number of samples equal to $N+N_{CP}$ for each symbol transmitted since $N_{RP}/2$ samples are overlapped at each end of each symbol, regardless of the value of $N_{RP}$ which can be zero or any of four other fixed values.

Thus, in summary and for reference in regard to definitions of terminology, fixed number of samples is synonymous with IDFT length and with the payload portion of a symbol. The terms symbol or extended symbol refer to the sum of the fixed number of payload samples, the cyclic prefix length (copied from the last samples of the symbol payload) and, in some cases, the overlapped rolloff period length (which may be zero but if non-zero, is copied from the first samples of the payload samples and appended to the end of the symbol payload).

Figure 7:
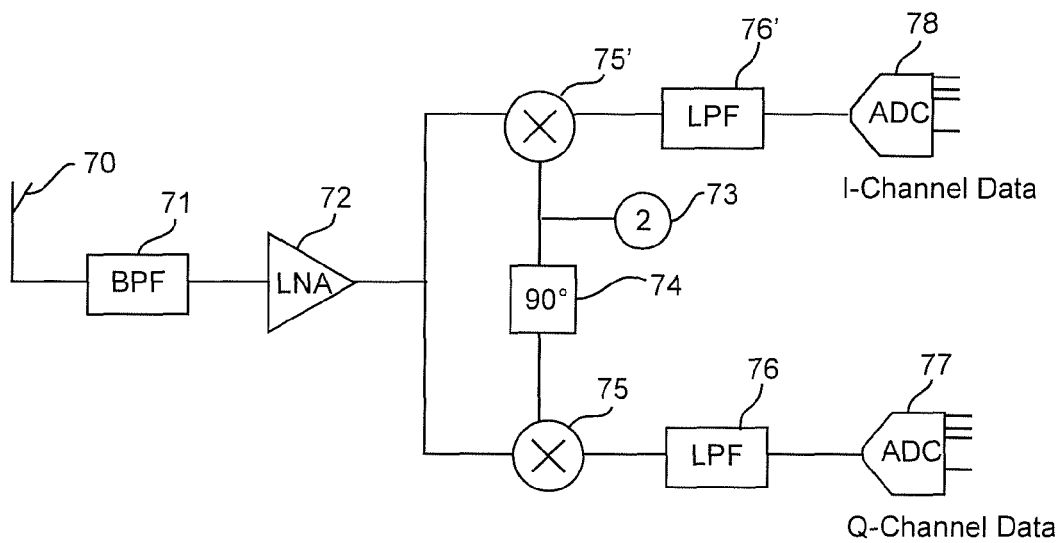
FIG. 7 is a high-level block diagram of a digital direct conversion receiver implementation.

The function of the proposed system and method is to determine the presence or absence of this OFDM signal, which may or may not be egressing from the cable system but, if present, may be weaker than the thermal and ambient background noise at the detector if the detector is more than a very short distance from a BCS leak. Referring now to FIG. 7, in order to perform this function of detecting an OFDM format signal, the proposed system first uses an antenna 70 to receive radio frequency (RF) energy from the surrounding area as an electrical signal, uses a band-pass-filter (BPF) 71 to select a band of frequencies in which the cable system of interest has allocated a portion of its OFDM downstream signal, amplifies this selected band of frequencies with a low-noise amplifier (LNA) 72, tunes or down-converts this amplified signal to a baseband signal, preferably a quadrature baseband signal having real and quadrature components, of positive and negative frequencies centered about zero Hertz (Hz) using local oscillator 73, 90° phase shifter 74 and multipliers 75, 75', essentially functioning as mixers. Low-pass filters (LPF) 76, 76' limit this baseband or quadrature baseband signal to prevent aliasing during the subsequent sampling process. Then the proposed system quantizes and samples this filtered signal using analog-to-digital converters (ADC or A/D) 77, 77'. This combination of elements and/or processing steps implements a direct-conversion digital receiver in accordance with one embodiment of the invention although other receiver arrangements are possible and will be apparent to those skilled in the art.

The samples from the A/D converters are then processed as a stream of complex numbers by a digital signal processor (DSP) which may be a specialized DSP integrated circuit (IC) or a more generic microcontroller unit (MCU) deemed sufficiently suitable and programmed for DSP functions, or a field programmable gate array (FPGA) or other application specific integrated circuit (ASIC) containing custom digital circuitry for signal processing (or perhaps several such processing circuits in parallel within an FPGA or ASIC).

The technique used by the proposed system to determine the presence or absence of an OFDM signal in noise, generally of a higher level, is autocorrelation. In autocorrelation the samples in a data stream are each multiplied with the complex conjugate of earlier or later samples of the same data stream. One formula for discrete autocorrelation without normalization is given by the following equation.

$$R_{xx} = \sum_{k=0}^{M-1} x_k \bar{x}_{k-j}$$

In this equation $R_{xx}$ is the autocorrelation, M is the number of samples over which the autocorrelation is being performed, k is the sample index, and j is the "lag" or number of samples (e.g. delay) between the starts of sample groups that correspond to the cyclic prefix on which the autocorrelation is to be performed. The variable operator $\bar{x}$ indicates the complex conjugate of the variable x.

A non-optimal method would be selecting a "lag", j, equal to the size (N) of the OFDM IDFT (e.g. 4096 or 8192 samples) being used by the cable system operator so that the autocorrelation picks out the correlation of the $N_{CP}$ samples of each cyclic prefix against the last $N_{CP}$ samples of the symbol, from which the cyclic prefix of the symbol was generated. When the autocorrelation is taken over a sufficient number of symbols, the background noise will fail to correlate, producing an essentially zero value, and the presence or absence of the OFDM signal will become apparent from the value of the autocorrelation output. As a preferred alternative, if the lag, j, is set to the sum of the size (N) of the OFDM IDFT and the cyclic prefix length, the autocorrelation will be performed between the entirety of adjacent symbols which, if applied to pilots which are identical from symbol-to-symbol, will rapidly and monotonically exhibit increased autocorrelation.

Figure 8:
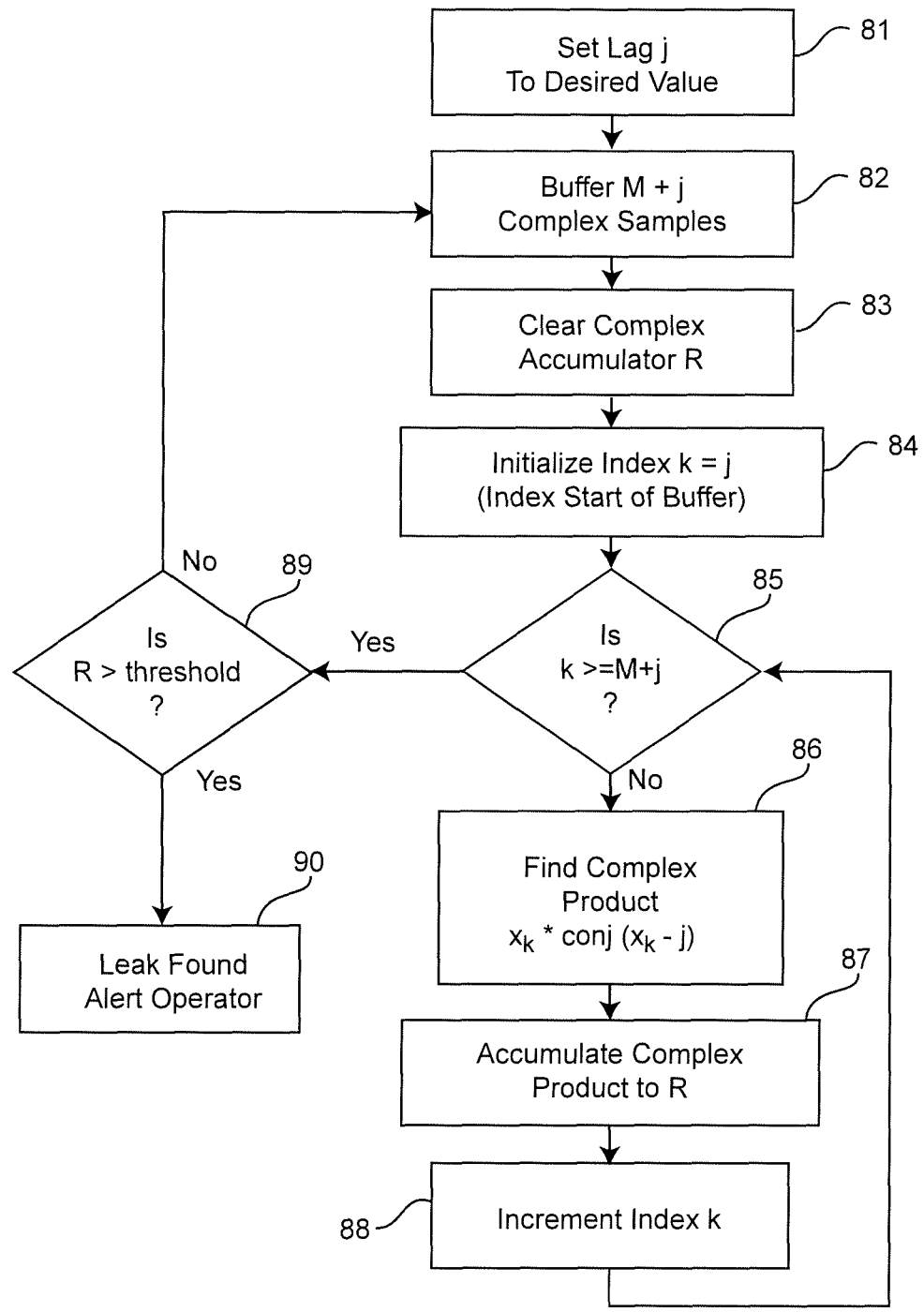
FIG. 8 is a flow diagram illustrating autocorrelation in accordance with the invention.
Figure 9:
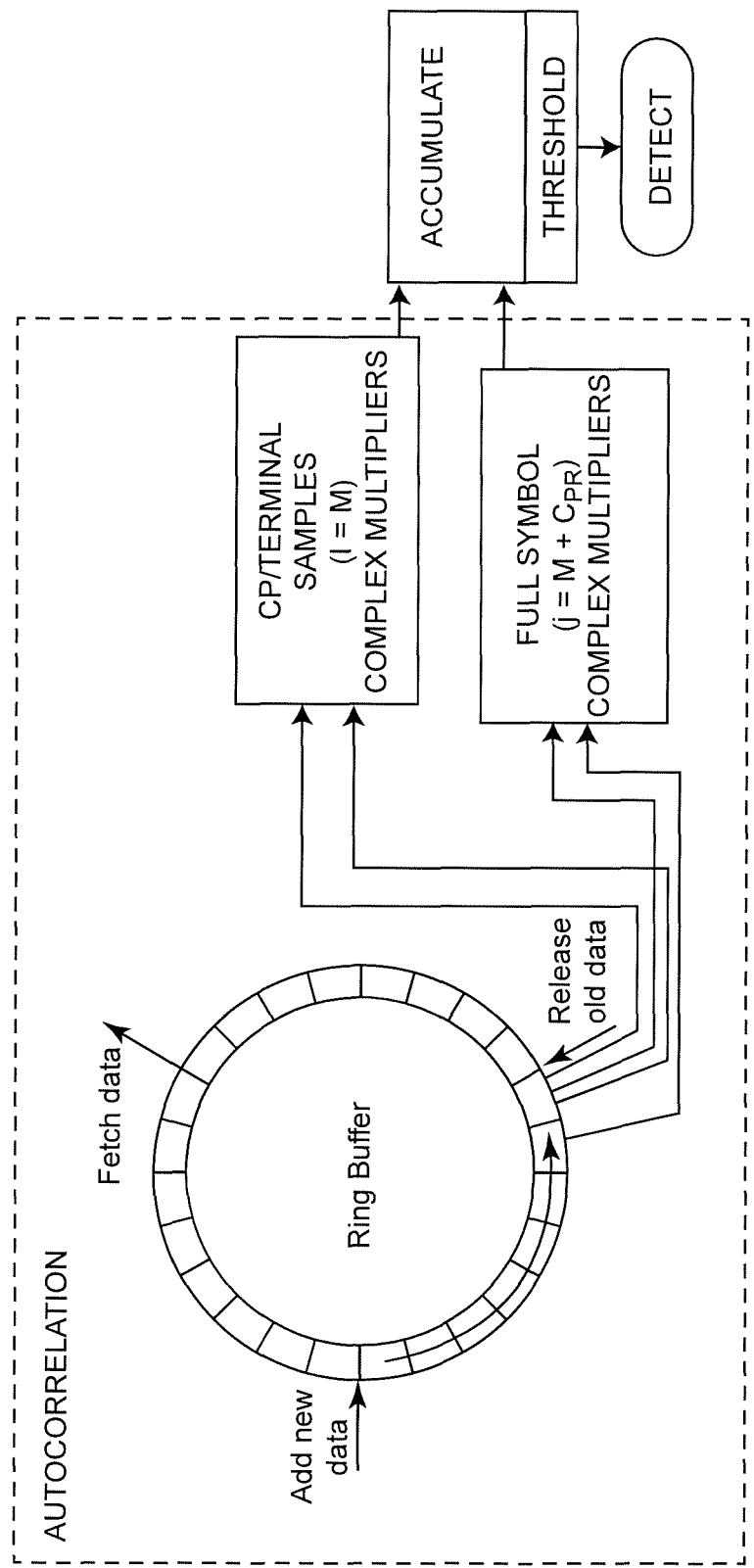
FIG. 9 is a schematic diagram of a ring buffer and its operation which is preferred for implementing the autocorrelation process over the direct method of FIG. 8.

The preferred algorithm for the autocorrelation process for application to pilot subcarriers is illustrated in FIGS. 8 and 9 but is also applicable to data symbols with a different value of j as alluded to above. The process begins with setting j to $N+N_{CP}$ as depicted at 81. Then, as shown at 82, M+j complex samples are buffered and the value of R is cleared and the value of k is initially set to j as shown at 83 and 84. Then it is determined if k≥M+j and, if not, the complex product $x_k$*conj $(x_{k-j})$ is found as shown at 86 and this product is accumulated into R as shown at 87. Then k is incremented as shown at 88, after which the process loops to 85. If k M, it is determined if the accumulated value of R is above a threshold as indicated at 89 as determined by an analog or digital comparator or the like, as illustrated in FIG. 9. If not, the process loops to 82 to buffer new samples and the process repeats. If R exceeds a threshold at 89, it is determined that a leak has been detected.

As alluded to above, a ring buffer such as is schematically depicted in FIG. 9 is a preferred device for use in the algorithm depicted in a less practical but more readily visualized direct form in FIG. 8 and discussed above. Such a ring buffer (sometimes referred to as a circular buffer) basically implements a sliding window on the complex samples received. When a ring buffer is used, the autocorrelation would be updated each sample time by adding the complex product corresponding to the incoming sample and subtracting the complex product corresponding to the outgoing sample with accumulation and optional thresholding of the autocorrelation result. Such a ring buffer can be implemented in many ways such as the following "C" language code:

```
#define M SIZE_OF_BUFFER
#define j AUTOCORR_LAG
typedef struct
{
    int16_t re, im;
}
cint16_t;
typedef struct
{
    int32_t re, im;
}
cint32_t;
cint32_t R = {0, 0}; // autocorrelation output
cint16_t x[M]; // data buffer
uint32_t k = 0; // pointer to next data to write
uint32_t a = 0; // counter to track amount of data in buffer
cint16_t iconj(cint16_t x); // complex conjugate
cint32_t icprod(cint16_t x1, cint_16 t x2); // complex integer multiplication
cint32_t icadd(cint32_t x, x2); // complex integer addition
cint32_t icsub(cint32_t x, cint32_t x2); // complex integer subtraction
void nextSample(cint16_t y); // call when new data sample y is received
cint16_t iconj(cint16_t x)
{
    x.im = -x.im;
    return x;
}
cint32_t icprod(cint16_t x1, cint16_t x2)
{
    cint32_t x;
    x.re = (int32_t)x1.re * x2.re - (int32_t)x1.im * x2.im;
    x.im = (int32_t)x1.im * x2.re + (int32_t)x1.re * x2.im;
    return x;
}
cint32_t icadd(cint32_t x, cint32_t x2)
{
    x.re += x2.re;
    x.im += x2.im;
    return x;
}
cint32_t icsub(cint32_t x, x2)
{
    x.re -= x2.re;
    x.im -= x2.im;
    return x;
}
void nextSample(cint16_t y)
{
    int32_t q = k - j; // offset to lag term
    uint32_t p = q < 0 ? q + M : q; // handle wrap-around
    if(a < M)
        a++;
    else // buffer fill complete
        // subtract outgoing complex product x[k] * conj(x[k+j])
        R = icsub(R, icprod(x[k], iconj(x[p])));
    x[k] = y; // replace outgoing complex data x[k] with incoming complex data y
    // add incoming complex product x[k] * conj(x[k+j])
    R = icadd(R, icprod(x[k], iconj(x[p])));
    k++; // point to next element
    k %= M; // handle wrap-around
}
```

Figure 10:
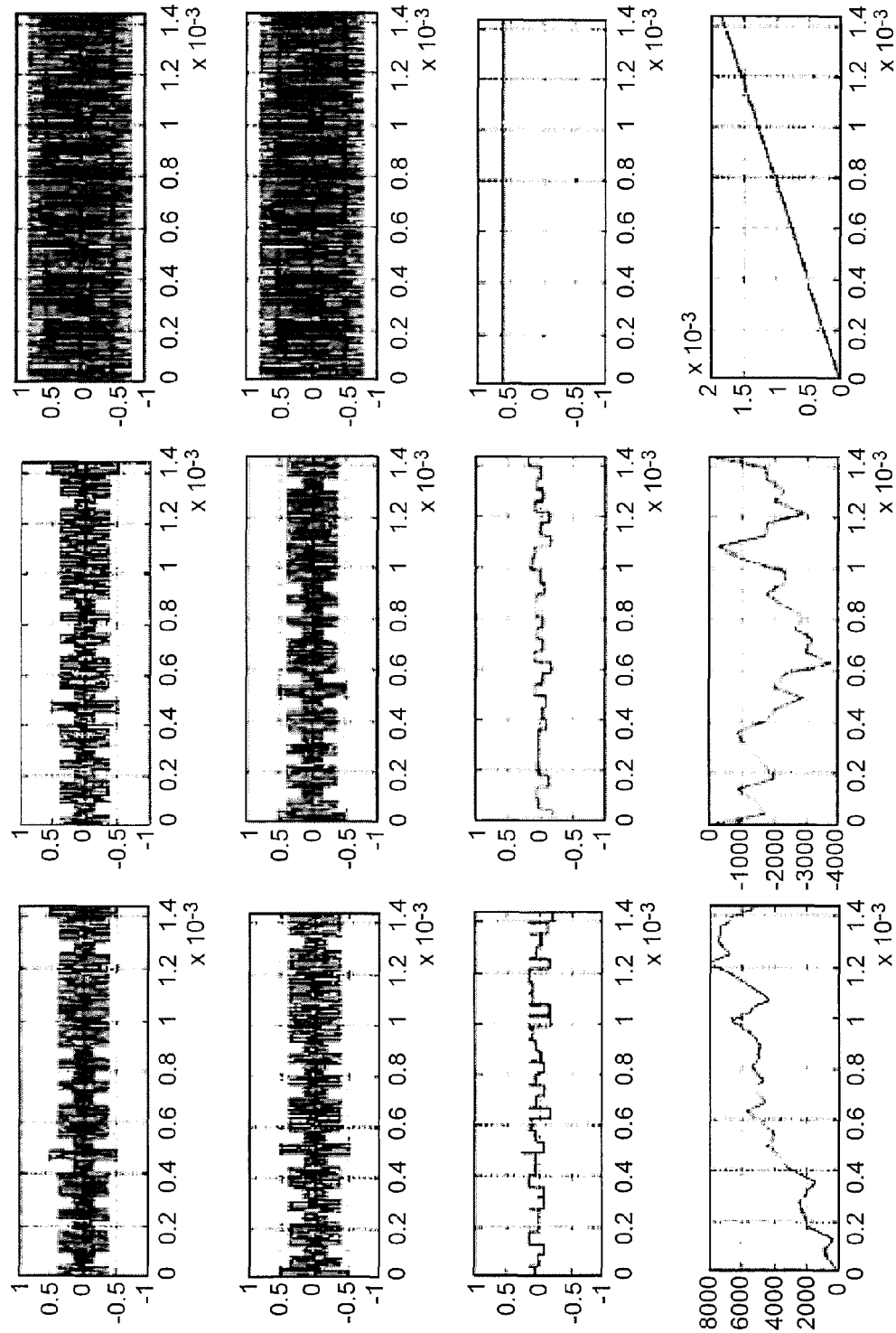
FIG. 10 illustrates results of autocorrelation processing without background noise.

The processing of FIGS. 8 and 9 and the C code given above may be better visualized in FIG. 10 which shows, in the top row, an OFDM data stream in the left and center columns and an OFDM pilot in the right column, all with cyclic prefix applied. In the second row these same waveforms are delayed by some amount (the "lag", j), in the left column by N and in the center and right columns by $N+N_{CP}$. In the third row the product of the top two rows, computed point-by-point (e.g. k) is shown. Actually, these are all the real portions of those signals and the product is taken as the product of the original sample with the complex conjugate of the delayed sample. In the bottom row this product is accumulated. Note that this accumulation occurs over several symbol times, in this (FIG. 10) case, 32. Also note there is no noise added to these plots to make visualization of the concept easier. In the proposed system the number of symbols integrated is much larger, hundreds or even thousands of symbols, and the noise power swamps the signal power by a factor of hundreds or even thousands.

The left column then shows the process and result of autocorrelation of an OFDM data stream with a lag of the IDFT size (N). As expected, this picks out the repetitive nature of the cyclic prefix (e.g. copied from the last $N_{CP}$ samples of the IDFT transformed symbol data), even though the surrounding data (e.g. the remainder of the symbol) is changing.

The center column then shows the process and result of autocorrelation of an OFDM data stream with a lag of the extended symbol size ($N+N_{CP}$). As expected, the changing data fails to significantly correlate, in this particular case it almost fails to correlate at all.

The right column then shows the process and results of autocorrelation of an OFDM pilot with a lag of the extended symbol size ($N+N_{CP}$). As expected, this picks out the repetitive nature of the entire pilot symbol, which is much stronger than merely picking out the cyclic prefix as in the left column.

One issue which the method using lag of N fails to solve is that, where two or more cable systems are over-built in the same location with 192 MHz OFDM blocks overlapping in frequency, this method is unable to selectively detect egress from only the cable system of interest. To solve this issue it is proposed that the cable system of interest generate a continuous OFDM pilot (or multiple pilots) at a subcarrier frequency where the other over-builders do not have a continuous OFDM pilot. Then it is proposed that the detector system tune to this subcarrier frequency (or to these multiple subcarrier frequencies) with a bandwidth narrow enough to avoid overlap with any other over-builder's continuous OFDM pilots. Finally, by selecting the autocorrelation "lag" to be equal to the extended symbol time corresponding to $N+N_{CP}$ instead of just N, the entire extended symbol of the continuous pilot (or pilots) $N+N_{CP}$ will contribute to the autocorrelation instead of just $N_{CP}-N_{RP}$ (a gain of 6 to 14 dB in signal to noise ratio (SNR) over the other method depending on the selected system parameters), and the OFDM signal from another over-builder with no continuous pilot at those frequencies will fail to correlate, producing essentially zero value.

It should be appreciated that the invention thus provides two separate techniques which can be used independently or together for authenticating a received signal as an OFDM signal: (a) performing autocorrelation with j=N in which case the autocorrelation will compare the cyclic prefix samples with the final samples of all symbols in the data stream (regardless of whether or not the $N_{PR}$ rolloff samples are included) or (b) autocorrelation with j=$N+N_{CP}$ of the samples in a pilot signal or signals where all samples including the cyclic prefix and the rolloff period will correlate. The second of these techniques will produce a far stronger and more monotonic increase in autocorrelation as depicted in the right-hand columns of FIGS. 10-12. It should be particularly appreciated that since the OFDM band and pilots within the OFDM band can be placed at any location within the BCS bandwidth, the most important difference is the ability to perform autocorrelation at a frequency where the OFDM operator has placed a pilot that does not coincide with a pilot in an over-built system. In such a case, which is entirely under the control of the BCS operator, there will be strong and readily detectable autocorrelation at the frequency chosen for the pilot as shown in the right column of FIGS. 10-12 while data subcarriers in an overbuilt BCS at that frequency will produce no or very little autocorrelation as shown in the center columns of FIGS. 10-12 where an over-builder's data is present without a pilot.

Figure 11:
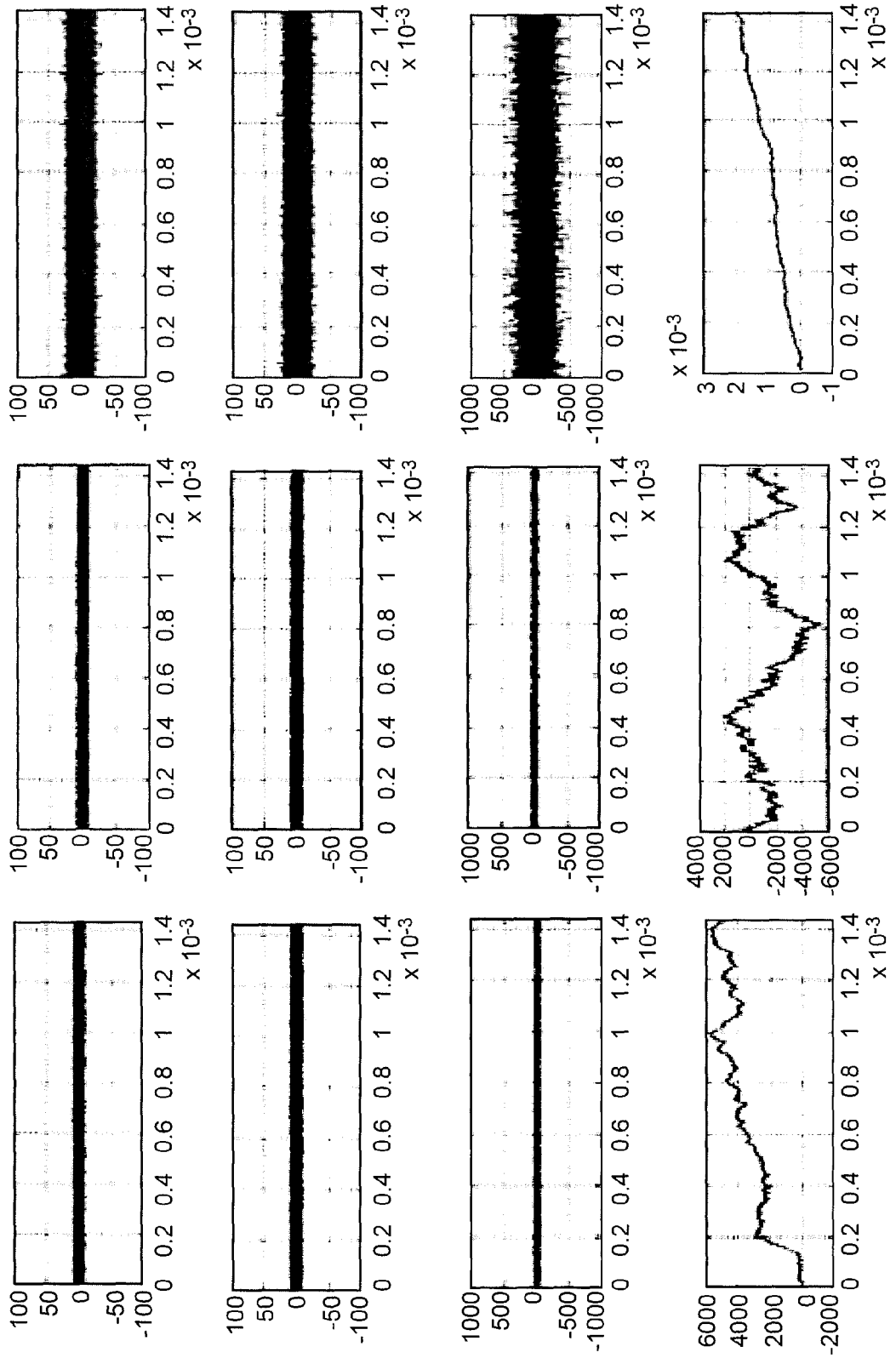
FIGS. 11 and 12 illustrate results of autocorrelation processing with different levels of background noise.
Figure 12:
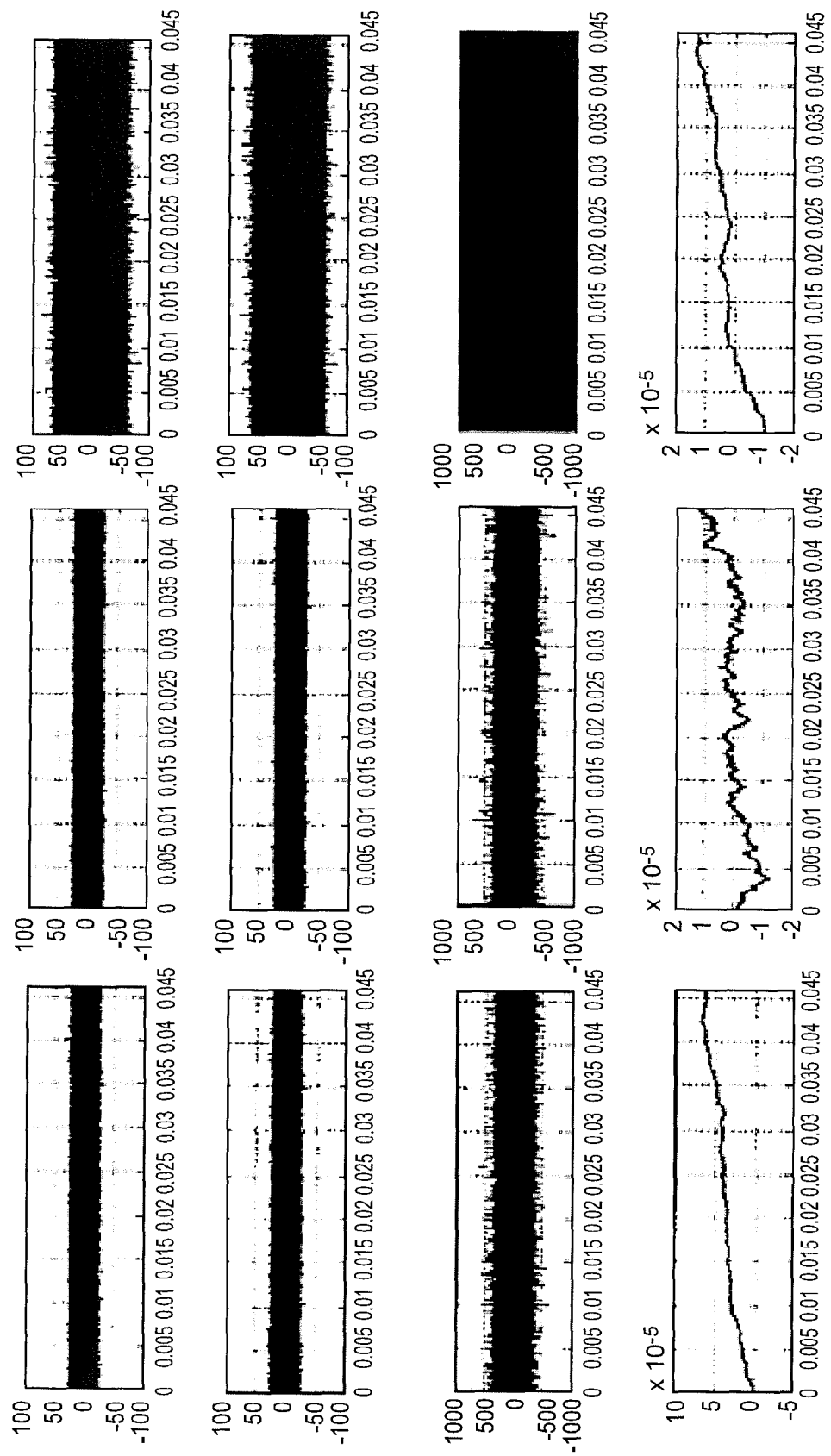

In the following discussion, it should be noted that the data depicted in FIGS. 11 and 12 is selected to more clearly illustrate the principles and operation of the invention and that it is operable. However, FIGS. 11 and 12 are not intended to illustrate proof of concept of the methodology in all circumstances.

FIG. 11 shows the same data and processing as is shown in FIG. 10 but with the data in the presence of additive white Gaussian noise creating a signal-to-noise (SNR) ratio of −20 dB for the OFDM data. The result of autocorrelation with either of the above values of j still shows good, substantially monotonic detection of the cyclic prefix of the symbols while the remainder of the symbols fails to exhibit autocorrelation. Again it should be recalled that, in practice, autocorrelation would be performed over hundreds if not thousands of symbols in a very short period of time to determine the presence or absence of an OFDM signal.

For example, FIG. 12 shows similar data to that of FIGS. 10 and 11 but with an SNR of −27 dB and with autocorrelation performed over 1024 OFDM symbols. Again, substantially monotonic increase in the autocorrelation value results with either of the values of j discussed above while little correlation is found in the data stream.

In view of the foregoing, it is seen that the overhead within individual symbols or groups of symbols of an OFDM signal wherein a number of samples of a symbol are replicated to provide a cyclic prefix can be exploited through autocorrelation using a suitable number of samples and lag of a suitable number of samples between groups of samples selected for autocorrelation processing. This processing can unambiguously detect presence of an OFDM coded signal among noise and broadcast signals within the bandwidth of BCS signals for authentication of a received signal as an egress signal from a BCS using either or both of two techniques. A single or multiple continuous pilot frequencies differing in frequency from continuous pilot frequencies in an overbuilt BCS can be used, in conjunction with a suitable correlation lag, to distinguish between egress signals from either BCS.

While the invention has been described in terms of a single preferred embodiment, those skilled in the art will recognize that the invention can be practiced with modification within the spirit and scope of the appended claims.

The invention claimed is:

1. A method of detecting an OFDM coded signal egressing from a shielding flaw in a cable communication system amid environmental noise, wherein said cable communication system carries signals in the form of a FFT length comprising a payload of each symbol and each symbol further includes a cyclic prefix comprising copies of a group of samples within a symbol, said method comprising steps of:
   receiving a signal;
   tuning or down-converting said signal to a baseband signal;
   performing analog-to-digital conversion of said baseband signal to provide a digital data stream corresponding to said symbols; and
   performing autocorrelation in accordance with said symbols with a lag either of said FFT length or of a number of samples equal to a sum of said FFT length and said cyclic prefix.

2. The method as recited in claim 1, wherein a duration of said cyclic prefix is one of 0.9375, 1.25, 2.5, 3.74 and 5.0 microseconds or a length of one of 192, 256, 512, 768 and 1024 samples.

3. The method as recited in claim 1, further including a step of applying a threshold to a result of said autocorrelation step.

4. The method as recited in claim 1, wherein said autocorrelation with a lag equal to said sum of said FFT length and length of said cyclic prefix is applied to a pilot or pilots not present as a pilot or pilots at the same frequencies in another, geographically proximate or over-built broadband communication system.

5. The method as recited in claim 1, wherein each symbol additionally comprises a windowing and replication of initial samples of each symbol, appended to an end of each said symbol and overlapped with the initial samples of the following symbol to form a roll-off period.

6. The method as recited in claim 1, wherein said baseband signal is a quadrature baseband signal.

7. A detector for determining presence or absence of an orthogonal frequency division multiplex signal including a cyclic prefix, said detector comprising:
   an antenna;
   a receiver including a band pass filter and mixers for producing a baseband signal from a signal received by said antenna;
   analog to digital converters for sampling said baseband signal to produce a stream of samples; and
   digital circuitry for performing autocorrelation on selected groups of samples in said stream of samples, wherein said selected groups of samples are separated by a lag equal to either a FFT length or the sum of the FFT length and the number of samples in the cyclic prefix.

8. The detector as recited in claim 7 further including a comparator for applying a threshold to an output of said digital circuitry performing autocorrelation.

9. The detector as recited in claim 7, wherein a duration of said cyclic prefix is one of 0.9375, 1.25, 2.5, 3.74 and 5.0 microseconds or a length of said cyclic prefix is of one of 192, 256, 512, 768 and 1024 samples.

10. The detector as recited in claim 7, wherein said receiver receives a pilot or pilots not present as a pilot or pilots at the same frequencies in another, geographically proximate or over-built broadband communication system.

11. The detector as recited in claim 7, wherein each symbol additionally comprises a replication of initial samples of each symbol appended to an end of each said symbol and overlapped with the initial samples of the following symbol to form a roll-off period.

12. The detector as recited in claim 7, wherein said baseband signal is a quadrature baseband signal.

* * * * *